(12) United States Patent
Kiilerich et al.

(10) Patent No.: US 7,475,078 B2
(45) Date of Patent: Jan. 6, 2009

(54) TWO-WAY SYNCHRONIZATION OF MEDIA DATA

(75) Inventors: Dennis A. Kiilerich, Kirkland, WA (US); Michael J. Novak, Redmond, WA (US); Kevin P. Larkin, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 233 days.

(21) Appl. No.: 11/420,989

(22) Filed: May 30, 2006

(65) Prior Publication Data

US 2007/0282848 A1  Dec. 6, 2007

(51) Int. Cl.
*G06F 17/30* (2006.01)
(52) U.S. Cl. ...................................... 707/10
(58) Field of Classification Search ............... 707/2, 707/3, 10, 203
See application file for complete search history.

(56) References Cited

U.S. PATENT DOCUMENTS

| | | | |
|---|---|---|---|
| 4,591,974 | A | 5/1986 | Dornbush et al. |
| 5,265,248 | A | 11/1993 | Moulios et al. |
| 5,410,698 | A | 4/1995 | Danneels et al. |
| 5,645,263 | A * | 7/1997 | Aardema ............... 251/30.02 |
| 5,706,509 | A | 1/1998 | Man-Hak Tso |
| 5,872,969 | A | 2/1999 | Copeland et al. |
| 5,909,689 | A * | 6/1999 | Van Ryzin ............... 707/203 |
| 5,950,198 | A | 9/1999 | Falls et al. |
| 6,052,735 | A | 4/2000 | Ulrich et al. |
| 6,248,946 | B1 | 6/2001 | Dwek |
| 6,324,544 | B1 | 11/2001 | Alam et al. |
| 6,587,127 | B1 | 7/2003 | Leeke et al. |
| 6,587,949 | B1 | 7/2003 | Steinberg |
| 6,625,623 | B1 | 9/2003 | Midgley et al. |
| 6,760,721 | B1 | 7/2004 | Chasen et al. |
| 7,113,454 | B2 | 9/2006 | Matsuoka |
| 2002/0078075 | A1 | 6/2002 | Colson et al. |
| 2002/0184180 | A1 | 12/2002 | Debique et al. |
| 2002/0193895 | A1 | 12/2002 | Qian et al. |
| 2003/0028613 | A1 | 2/2003 | Mori |
| 2003/0079038 | A1 | 4/2003 | Robbin et al. |
| 2003/0135513 | A1 | 7/2003 | Quinn et al. |
| 2003/0149816 | A1 | 8/2003 | Poo et al. |

(Continued)

FOREIGN PATENT DOCUMENTS

WO   WO0033259   6/2000

(Continued)

OTHER PUBLICATIONS

Luo et al., "Integrating Wireless LAN and Cellular Data for the Enterprise," IEEE Internet Computing, Mar./Apr. 2003, pp. 25-33, vol. 7, No. 2.

(Continued)

*Primary Examiner*—Etienne P LeRoux
(74) *Attorney, Agent, or Firm*—Senniger Powers LLP (57) ABSTRACT

A system and method for retrieving media data from a portable media device for storage on a client computer during synchronization between the portable media device and the client computer. A media player application (MPA) identifies media data on the portable media device that has been modified since a last synchronization process, and automatically or selectively retrieves the modified and/or unmodified media data from the portable media device for storage on the client computer.

19 Claims, 6 Drawing Sheets

U.S. PATENT DOCUMENTS

| | | |
|---|---|---|
| 2004/0001088 A1 | 1/2004 | Stancil et al. |
| 2004/0002310 A1 | 1/2004 | Herley et al. |
| 2004/0125144 A1 | 7/2004 | Yoon |
| 2004/0177319 A1 | 9/2004 | Horn |
| 2004/0254659 A1 | 12/2004 | Bolas et al. |
| 2004/0260786 A1 | 12/2004 | Barile |
| 2005/0060435 A1 | 3/2005 | Xue et al. |
| 2005/0076088 A1 | 4/2005 | Kee et al. |
| 2005/0165898 A1 | 7/2005 | Morita et al. |
| 2005/0209050 A1 | 9/2005 | Bartels |
| 2005/0235015 A1 | 10/2005 | Abanami et al. |
| 2005/0246375 A1 | 11/2005 | Manders et al. |
| 2006/0009215 A1 | 1/2006 | Bogod et al. |
| 2006/0136517 A1* | 6/2006 | Creamer et al. ............. 707/204 |

FOREIGN PATENT DOCUMENTS

| | | |
|---|---|---|
| WO | 1291770 A2 | 3/2003 |
| WO | WO2005109829 | 11/2005 |

OTHER PUBLICATIONS

Gupta at al., "Jini Home Networking: A Step toward Pervasive Computing," Computer, 2002, pp. 34-40, vol. 35, No. 8.

Helal et al., "A Three-tier Architecture for Ubiquitous Data Access," Computer Systems and Application, 2001, pp. 177-180.

* cited by examiner

TWO-WAY SYNCHRONIZATION OF MEDIA DATA

TECHNICAL FIELD

The present invention relates to the field of processing digital media content. In particular, this invention relates to an improved system and method for transferring media data between media devices.

BACKGROUND

Due to recent advances in technology, computer users are now able to enjoy many features that provide an improved user experience, such as playing various media and multimedia content on their personal or laptop computers. For example, most computers today are able to play compact discs (CDs) so users can listen to their favorite musical artists while working on their computers. Many computers are also equipped with digital versatile disc (DVD) drives enabling users to watch movies.

In some multimedia environments, a computer has access to a computer-readable medium storing compressed media files. Common media file types include Moving Picture Experts Group audio layer-3 (MP3) files and WINDOWS MEDIA® technologies audio (WMA) and video (WMV) files. The computer typically organizes the media files into playlists when the compressed media files are played on the computer. The files may be organized according to metadata or other property data associated with the media content. Metadata for a digital media file such as an audio file usually includes general information pertaining to the media file itself. This information is typically stored within the file. For example, an audio file may have metadata tags for the song title, song artist, album title, and a rating. In another example, in the case of audio media files, the files may be organized by album, artist, genre, date, or some user-specified selection and ordering of metadata. A user navigates through this organization using menus and graphical displays to render the desired media files.

Often, users transfer media content from a personal computer to a variety of other devices including another personal computers or portable consumer electronic media devices (e.g., MP3 players). However, conventional personal computers cannot efficiently retrieve media content from portable consumer electronic media devices for storage on the personal computer. Because portable media devices often allow users to modify or update media content stored on portable device, to improve the media experience on the desktop, it is important to seamlessly integrate such updates and modifications to the media content on the desktop.

SUMMARY OF THE INVENTION

Aspects of the invention allow for improved management of media data during a synchronization process between a portable computing device and a client computer. One aspect of the invention permits a user of a client computer to identify and retrieve media data from a portable media device that has been modified or added since a previous synchronization process between the portable computing device and the client computer. Other aspects of the invention allow the user of the client computer to view media data that has been added and/or modified since a previous synchronization process, and allows the user to select media data to retrieve from the portable media device for storage on the client computer.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
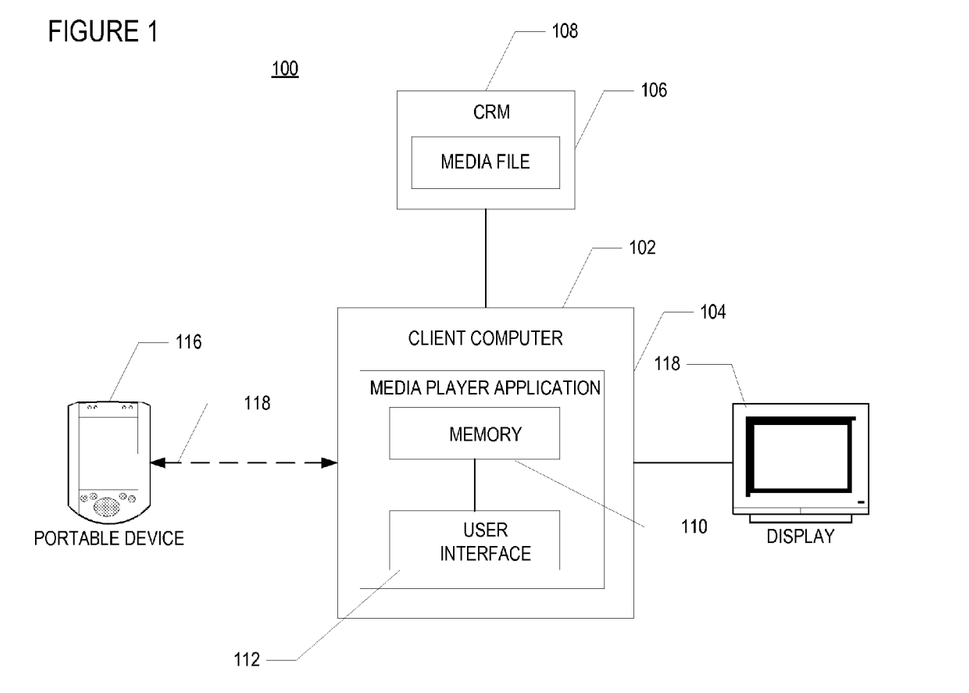
FIG. 1 is an exemplary block diagram illustrating a suitable operating environment in which embodiments of the invention may be implemented.

Referring now to the drawings, FIG. 1 illustrates an exemplary computer system 100 in which the present invention can be used. System 100 includes a client computer 102 that executes a media player application (MPA) 104. The media player application 104 can be any suitable rendering filter or program configured to play digital media so that a user can experience the content embodied on the media. For example, suitable MPAs 104 include a CD media player application, a digitally-compressed file player application, and/or a DVD media player application. Executing the MPA 104, allows the user to access a digital media file 106 stored on a computer-readable medium (CRM) 108 such as a compact disc, a network server, a hard disk of the client computer, or any other suitable computer storage media. Executing the MPA 104 also enables the user or, particularly, enables the MPA 104 to access, retrieve, store, and display for the user, so-called metadata. Those skilled in the art are familiar with metadata, which is simply information about the file or its contents. In the context of the present invention, metadata involves information related to specific content of digital media file 106 being played via the MPA 104. Basic metadata may include one or more of album title, artist, performer, genre, description of content, and the like. Extended or premium, or user defined metadata includes album art, performer biographies, reviews, related performers, where to buy similar items, upcoming concerts, ticket sales, URLs to other related experiences including purchase opportunities, and the like. As known to those skilled in the art, some metadata (e.g., basic metadata) can be included in the media file itself, and other metadata (e.g., user defined) can be included in a metadata table associated with the media file. Notably, in some cases user defined metadata can overlap basic metadata such as, for example, artist name, track title, album title, etc. The MPA 104 accesses a memory 110 for storing digital media files 106, and includes a graphical user interface 112 for displaying media files 106 and organized metadata to the user on a display 114, and for transferring media files 106 and organized metadata to a remote device such as a portable media device 116 communicatively connected to the computer 102.

As used herein media data includes media file data (e.g., media content and basic metadata) and associated metadata (e.g., user defined metadata and premium metadata.) Moreover, in the examples herein, the media content of digital media file 106 refers to a single song track or a collection of tracks such as found on an audio CD. It is to be appreciated and understood that the media content can be embodied on any suitable media, including digital files downloaded to the client computer's memory, and that the specific examples described herein are given to further understanding of the inventive principles. The media content can include, without limitation, specially encoded media content in the form of, for example, an encoded media file 106 such as media content encoded in Microsoft® Windows Media™ format using the Microsoft® Windows Media™ Player program.

By establishing a connection between the client computer 102 and the portable media device 116, media data can be transferred between the client computer and the portable media device 116. Notably, the connection may involve a wired connection such as a USB cable or IEEE 1394 interface (i.e., Firewire), a wireless communication technology such as TCP/IP 802.11 wireless networks, Bluetooth, GPRS, CDMA or other cellular data transmission networks, or any other computer-to-computer communications protocol. The process of transferring media data between the client computer 102 and the portable media device 116 so that they contain matching data is known as synchronization, as indicated by double arrow 118. Conventional synchronization involving media files 106 is typically one way. That is, media files and associated metadata can be transferred from the client computer 102 to a portable media device 116 (i.e., downloaded), but cannot be transferred from the portable media device 116 to the client computer 102.

The present invention provides improved management of media data during a synchronization process between the client computer 102 and a portable media device 116 by enabling two-way synchronization. More specifically, the present invention not only allows a user to transfer media data from a client computer to a portable media device, but also permits a user to identify media data stored on a portable media device 116 that has changed since a last synchronization process with a client computer and to selectively or automatically transfer a copy of the identified media data to the CRM 108 of the client computer 102. Notably, the invention also allows the user to select media data that has not changed since the last synchronization and to selectively or automatically transfer the identified unchanged media data to the CRM 108 of the client computer 102.

Figure 2:
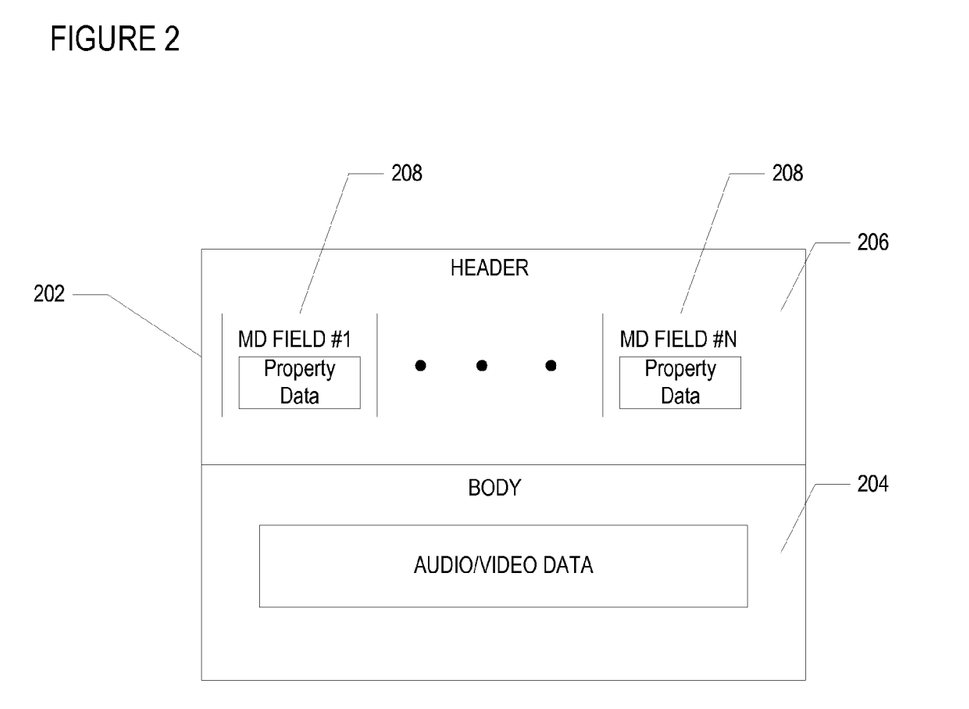
FIG. 2 is an exemplary block diagram illustrating the components of a media file.

Referring next to FIG. 2, the components of an exemplary media file 202 (e.g., media file 106) are shown. In this case, the media file 202 represents a song track such as described above in reference to FIG. 1. The media file 202 includes a body section 204 and a header section 206. The body 204 stores digital audio information that is used by the MPA 104 to play the particular music track. Although the body 204 is described herein as storing digital audio information, it is contemplated that the body 204 of a media file 202 may include digital video information. The header 206 includes digital information, which is used by the MPA 104 to display information (i.e., metadata) about the particular music track. For example, as described above, the header 206 may include track information such as the song title, song artist, and album title for the work as stored metadata. The header 206 includes a plurality of metadata fields 208 that each store property data for a particular category of metadata. Property data defines a particular property that the media file 202 has within the particular metadata category. For instance, metadata field #1 may store information related to a genre category, and may have a property that indicates the genre is "Rock," or may have property that indicates the genre is both "Rock" and "Ballad."

Figure 3:
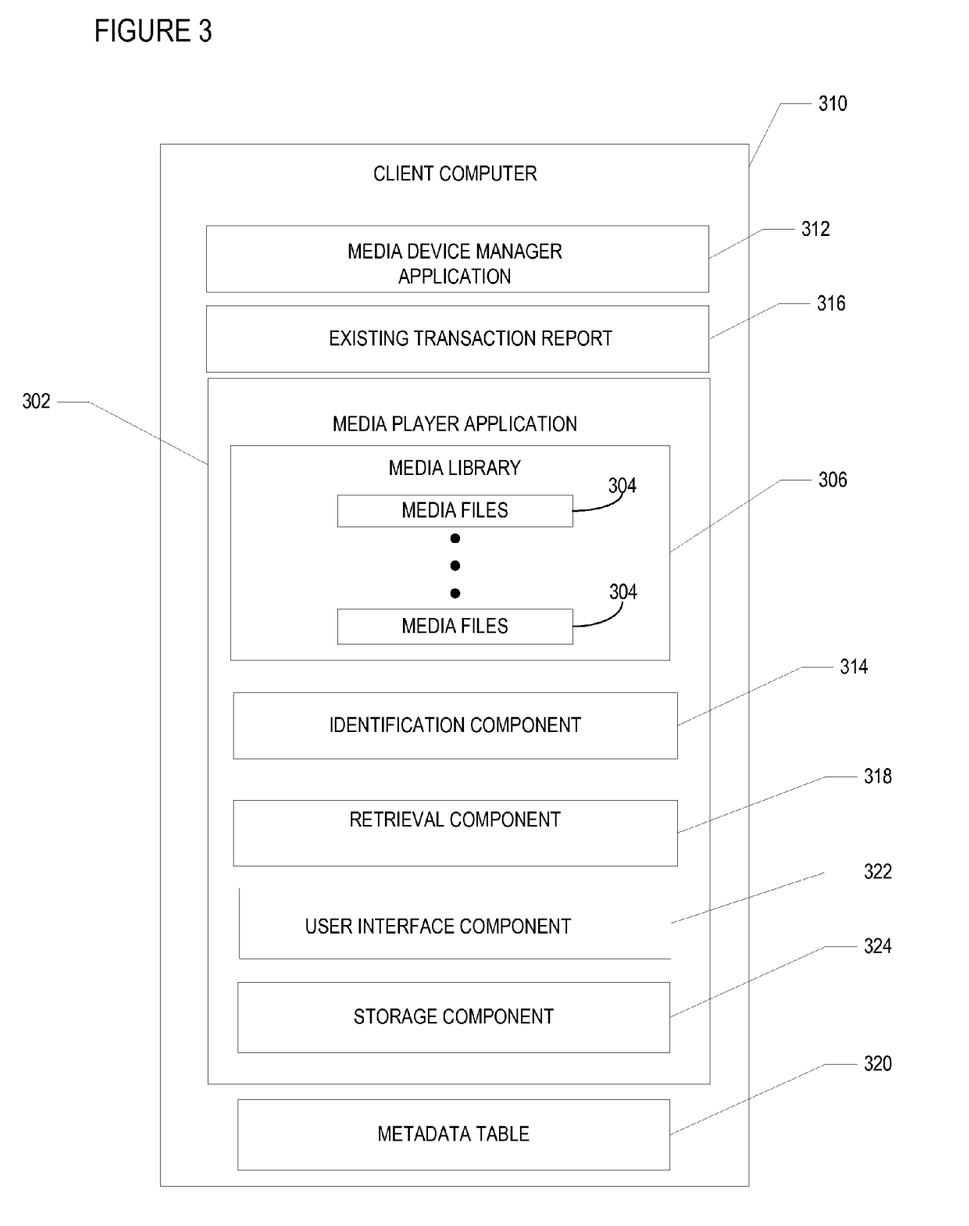
FIG. 3 is an exemplary block diagram illustrating components of a media player application according to one embodiment of the invention.

Referring next to FIG. 3, an exemplary block diagram illustrates basic components of a MPA 302 (e.g., MPA 104) having computer executable instructions for retrieving media data from a portable media device 116 for storage on a client computer 102 during a synchronization process 118. The MPA 302 includes a media library 306 (e.g., memory 110) for storing media files 304, and a user interface (e.g., user interface 112) for displaying and allowing a user to interact with media files 304. In this embodiment, a client computer 310 (e.g., computer 102) stores and executes a media device manager application 312 and the MPA 302. The media device manager application 312 monitors the client computer 310 for connection to a portable media device 116. As described above, the connection may involve a wired connection such as a USB cable or IEEE 1394 interface (i.e., Firewire), a wireless communication technology such as TCP/IP 802.11 wireless networks, Bluetooth, GPRS, CDMA or other cellular data transmission networks, or any other computer-to-computer communications protocol. The media device manager application 312 notifies the MPA 302 when it detects a portable media device 116 connected to the client computer 310.

The MPA 302 executes in response to the notification from the media device manager application 312 to initiate a synchronization process. More specifically, the MPA 302 executes an identification component 314 to identify media files 304 on the portable media device 116 added and/or modified since a last synchronization process. For example, the identifying component 314 identifies new media files by querying a computer readable medium (e.g., see CRM 408 in FIG. 4) of the portable media device 116 to identify a list of media files (e.g., see media files 410 in FIG. 4) stored on the portable media device 116 (i.e., a first list of media files) and by querying the media library 306 of the client computer 310 to identify a list of media files 304 stored on the client computer 310 (i.e., a second list of media files). The identifying component 414 compares the first list of media files to the second list of media files to identify new media files on the portable media device 116. In other words, if the list of media files stored on the portable media device 116 includes one or more additional files that are not included in the list of media files 304 stored on the client computer 310, these one or more files are identified as added or new media files.

According to another aspect of the invention, the identifying component 314 requests a transaction report from the portable media device 116 to identify media data that has been modified since the last synchronization process. In this particular embodiment, the transaction report is created and managed by the portable media device and includes a transaction identification (ID) value for each of the media files stored on the portable media device 116. Notably, the portable media device 116 may be configured with a protocol to create and manage the transaction report, or may execute an application (e.g., remote media player application) to create and manage the transaction report. For purposes of illustration, the portable media device 116 is described herein as executing a remote media player application to manage the transaction report.

Figure 4:
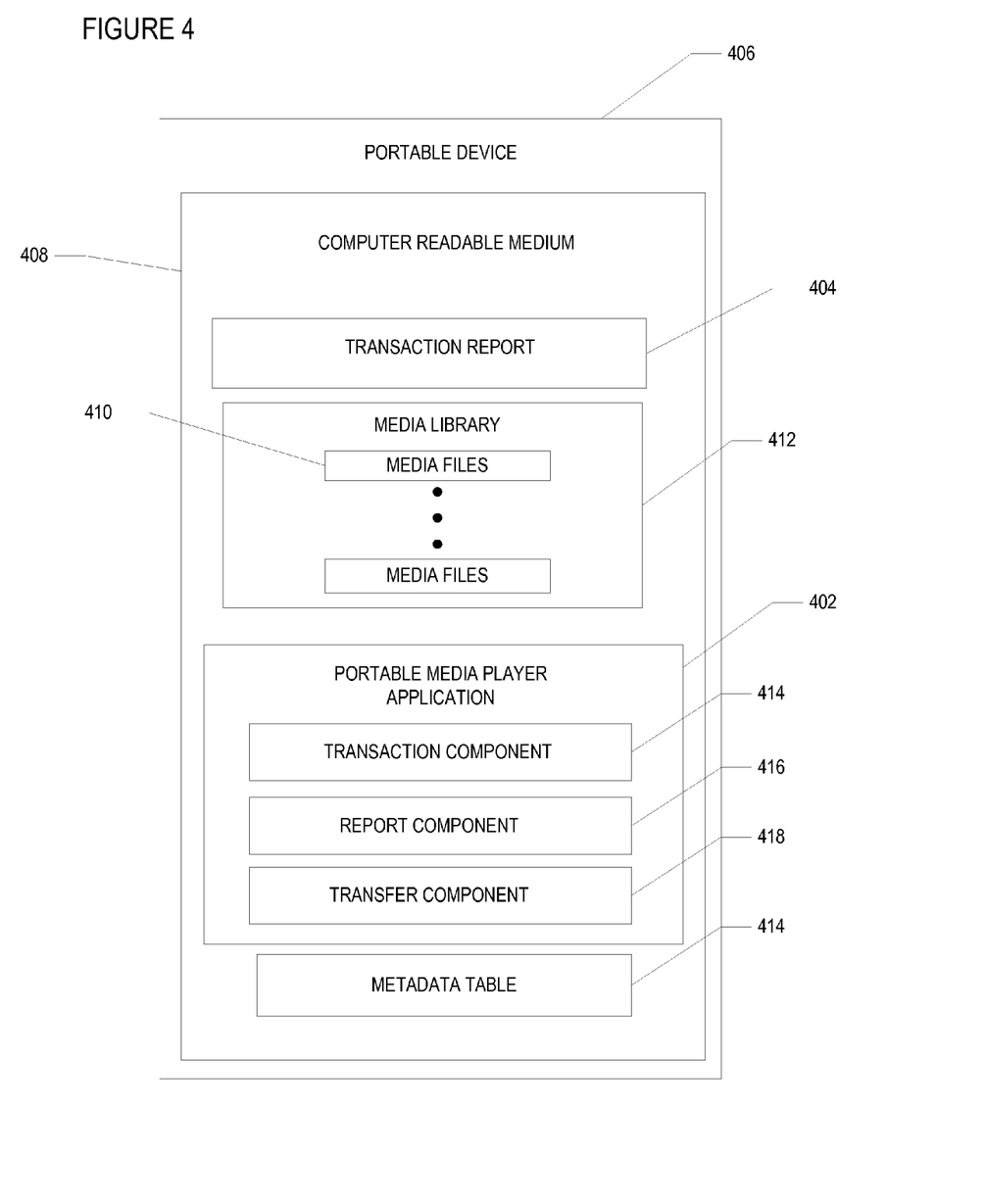
FIG. 4 is an exemplary block diagram illustrating components of a remote media player application according to one embodiment of the invention.

Referring now to FIG. 4, an exemplary block diagram illustrates basic components of a portable MPA 402 having computer executable instructions for creating and managing a transaction report 404 on a portable media device 406 (e.g., portable media device 116). The portable media device 406 includes a computer readable medium (CRM) 408 storing one or more media files 410 in a media library 412. The remote MPA 402 is responsive to a user of the portable media device 406 downloading a new media file for storage on the CRM 408, or modifying metadata associated with an existing media file 410 stored on the CRM 408 to execute a transaction component 414 to assign a transaction ID value to the media file or modify an transaction ID value previously assigned of the media file 410. The transaction ID value indicates the status of a media file stored on the portable media device 406. For example, the transaction component 414 is responsive to a user storing a new media file on the portable media device 406 to assign a transaction ID value equal of "0" to that particular file. The transaction component 414 is responsive to a user modifying media file data and/or associated metadata of an existing media file to increment the transaction ID value previously assigned to a particular media file. For example, transaction component 414 increments the transaction ID value when a user replaces the existing media file with an updated version or changes user assigned rating for that particular media file 410. Accordingly, a transaction ID value equal "0" indicates the media file is new, and a transaction ID value greater than "0" indicates the media file is not new.

A report component 416 generates a transaction report 404 that identifies a current transaction ID value of each of the media files 410 stored on the portable media device 406. Table 1 below provides an example of the information included in a transaction report. In this example, a media file named "musictrack1" has a transaction ID no. 0000000 indicating the "audiobook1" file is new, a media file named "playlist1" has a transaction ID value of 0000003 indicating "playlist1" file has been modified three times, and a media file named "audiobook1" has a transaction ID no. 0000001 indicating the "audiobook1" file has been modified once.

TABLE 1

Transaction Report

| TRANSACTION ID | MEDIA FILE NAME |
| --- | --- |
| 0000000 | musictrack1.wav |
| 0000003 | playlist1.asx |
| 0000001 | audiobook1.wav |

In an alternative embodiment, transaction component 414 is responsive to the portable media device 406 being disconnected from, for example, a client computer, to increment the transaction ID associated with each media file on the portable media device. Thereafter, the report component 416 can query the portable device for changes in the transaction ID since a particular transaction (e.g., ID=N), and generate a transaction report identifying media files where the transaction ID is >=N.

The remote MPA 402 is responsive to a transaction report request received from the client computer 310 to execute a transfer component 418 to transfer a copy of the transaction report 404 currently stored on the computer readable medium 408 of the portable media device 406 to the client computer 310.

Referring now back to FIG. 3, the identification component 314 is responsive to a current transaction report being transferred from the portable media device 406 to determine if there is an existing transaction report 316 stored in the memory 312 of the client computer 310. If there is an existing transaction report 316, the identification component 314 compares each of the media files 304 and their assigned values in the existing transaction report 316 to each of the media files 410 and their assigned transaction ID values in the current transaction report 404 to identify new media files and/or modified media files. For example if a media file included in the current transaction report 404 is not included in the existing transaction report 316 stored on the client computer 310, the identification component 314 identifies such media file a new media file. Alternatively, if the same media files are listed in both the existing and current transaction reports 404, 316 respectively, but there is a difference in the assigned transaction ID values for one or more files, the identification component 314 identifies such media files as modified media files.

According to one aspect of the invention, a retrieval component 318 is responsive to the identified new or modified media files to automatically retrieve media data associated with the identified media files from the portable media device 406. The amount of media data retrieved from the portable media device 406 depends on whether the identified media file is a new media file or a modified file. For example, if the media file has been identified as a new media file (i.e., there is not an existing matching file stored on client computer 310), the retrieval component 318 retrieves all media data associated with that media file. On the other hand, if the media file has not been identified as a new media file (i.e., there is existing matching file stored on client computer), the retrieval component 318 retrieves all media data associated with the selected media file added since the last synchronization process. For example, consider that the media file identified for retrieval is an audio book file entitled "Home Improvements." Further consider that the audio book file only includes a first chapter entitled "Proper and Safe use of Tools," and, thus, only a copy of the first chapter was retrieved from the client computer for during an initial synchronization process. If the user subsequently adds a second chapter of the book to the portable media device 406 entitled "Installing Flooring" and then initiates a synchronization process with the client computer 310, the retrieval component 318 identifies the selected media file as an existing media file as described above, and only retrieves the second chapter from the portable media device 406. In one such embodiment, the retrieval component 318 uses timestamps to determine which portion of the file media data to retrieve. For example, when the audio book file is initially retrieved and stored on the client computer 310, time stamp metadata indicating a date and time (e.g., Jan. 3, 2006, 3:00 PM) of retrieval is associated with the audio book file and stored in a metadata table 320 of the client computer 310. After the user of the portable media device adds the second chapter (e.g., Installing Flooring) and then initiates a synchronization process with the client computer 310, the retrieval component 318 retrieves any media data associated with the audio book media file that was added after the previously stored time stamp metadata (e.g., Jan. 3, 2006, 3:00 PM) and the updated time stamp metadata indicating a date and time of the latest media data retrieval (e.g., Jan. 7, 2006, 3:00 PM) is associated with the audio book file and stored in the metadata table 320 of the client computer 310.

Alternatively, the MPA 302 is responsive to the identified new media files and/or modified media files to execute a UI component 322 to display media files 304 via a user interface that allows the user to designate one or more of media files for copying from the portable media device 406 to the client computer 310. For example, referring briefly to FIG. 5, a screen shot illustrates an exemplary UI 502 (e.g., UI 112) for displaying identified new media files and/or modified media files 504. The user interacts with media files 504 being displayed via the UI 502 by using commonly known navigation techniques. For example, the user can use a mouse (not shown) linked to the client computer 310 to navigate through the UI 502, and select media files 504 by clicking a check box adjacent to a desired media file in a media file selection section 506. The UI 502 allows a user to designate a single identified media file or a group of identified media files for transfer. In this case, it can be seen that all the media files have check in the check box adjacent to the media files, and, thus, are all designated to be transferred to the client computer 310 from the portable media device 116.

Figure 5:
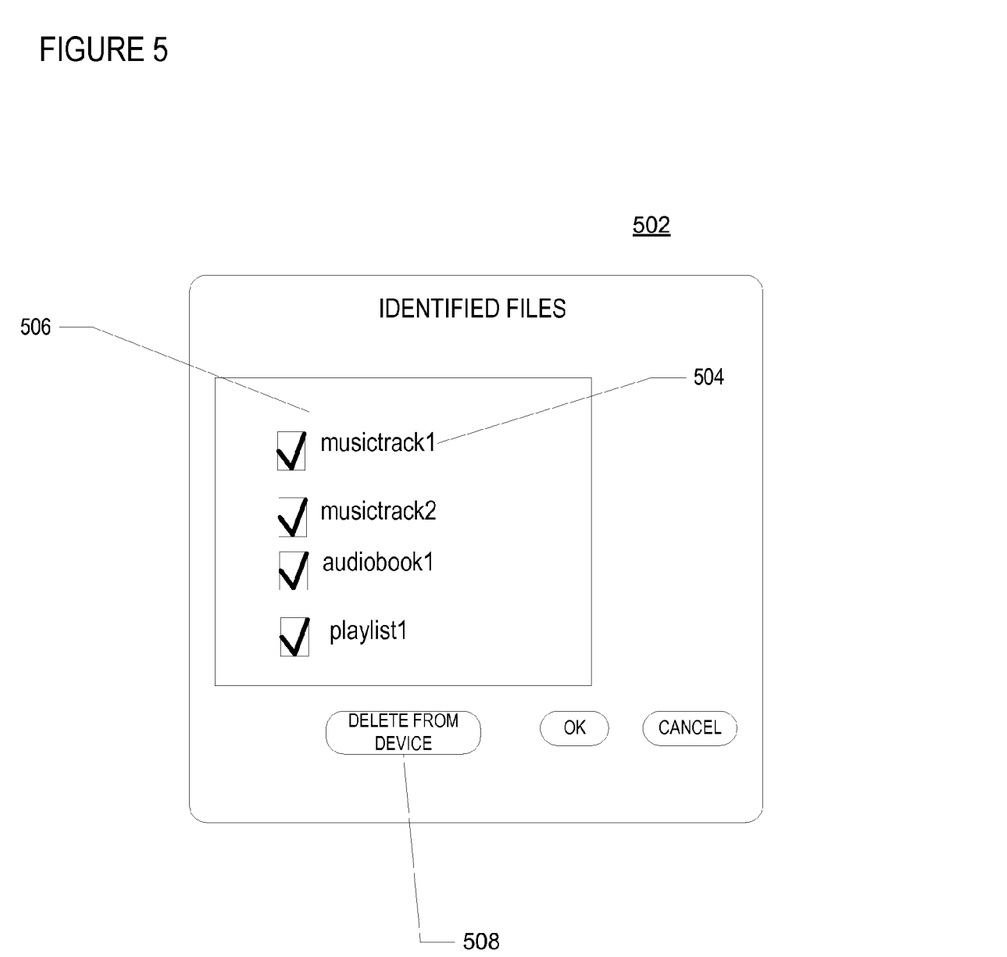
FIG. 5 is a screen shot of a graphical user interface provided by a media player application.

Referring back to FIG. 3, a retrieval component 322 is responsive to user input, received via the UI 502, selecting a particular media file to retrieve media data associated with that particular media file from the portable media device. In this embodiment of the invention, the retrieval component 322 operates the same as described above, except that only media data associated with identified media files selected by the user via the UI 502 are retrieved.

According to another aspect of the invention, the UI component 322 is responsive to the identification component 314 identifying a selected media file for retrieval from the portable media device as an existing media file to display an alert such as an alert box (not shown) to the user via the UI 502 indicating that that media data associated with the media file already exist on the client computer 310 and provides the user the option to continue with retrieval and/or cancel retrieval. For example, the identification component 314 identifies the selected media file as an existing media file by comparing "retrieve from file path" associated with the selected file on the portable media device with "retrieved from file path" data stored in the metadata table 320 stored on the client computer 310. For example, consider that selected media file is an audio book entitled Home Improvements located in the file path "F:\Book\Home_Improvements.wav." During an initial synchronization process, if a copy of the audio book media file is transferred to the client computer 310 for storage, the MPA 302 stores the retrieved from file path "F:\Book\Home_Improvements.wav as metadata associated with this particular file in the metadata table 320. Thus, if the audiobook1 file is selected for transfer during a subsequent synchronization process, the identification component 314 identifies the selected audio file as an existing media file because the retrieved from file path metadata associated with the selected file on the portable media device 406 matches a retrieved from file path metadata associated with a media file stored on the client computer 310. Notably, other identifiers can be used to detect the likeness of a file on the portable media device 406 with that of a file already on the client computer 310. For example, an identifier that is unique to files on the device can be used. Alternatively, metadata (such as artist, album, track name, etc) can be used.

A storage component 324 is responsive to media data retrieved from the portable media device to store the retrieved data in a memory of the client computer. For example, the storage component 324 stores media file data in the media library 306 and stores associated metadata in the metadata table 320. According to another aspect of the invention, after the storage component 324 stores media file data in the media library 306 and stores the associated metadata in the metadata table 320, the UI component 322 displays a deletion control (e.g., see 508 in FIG. 5) that is responsive to user input to send a deletion command to the portable media device to delete one or more the identified media files and associated metadata from the portable media device at 616. As a result, the user of the client computer to easily and efficiently free up storage space on the portable media device 406. In an alternative embodiment of the invention, the user interacts with the UI component to identify files to automatically delete during retrieval form the portable device. For example, the UI component 322 displays check box controls (not shown) adjacent to each of the displayed identified files, and the user enables the check box control adjacent to particular media file that the user would like to be deleted from the portable device during future synching operations. Additionally, the user can also specify criteria which are used to determine whether a given file should be deleted or not. As an example, the user interacts with the UI component 322 to define specific file types such as picture files (e.g., e.g., BMP, JPEG, GIF, etc) to automatically delete during retrieval from the portable device.

Figure 6:
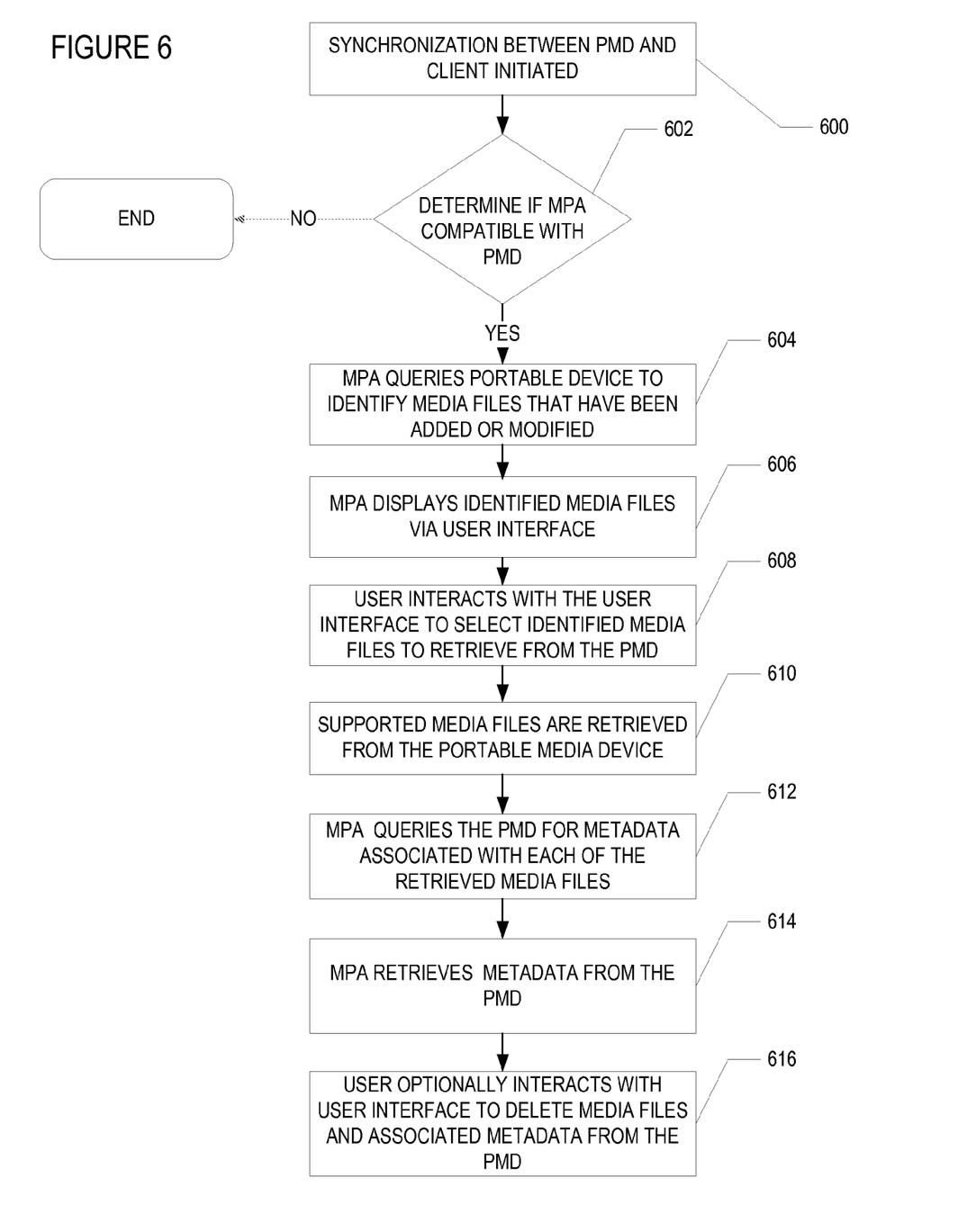
FIG. 6 is an exemplary flow chart illustrating a method for storing contact data to be stored in a shared electronic directory according to one exemplary embodiment of the invention.

Referring now to FIG. 6, an exemplary flow chart illustrates a synchronization process between a portable media device and a client computer according to one embodiment of the invention. After initiating a synchronization process at 600, a media player application (MPA) executing on the client computer determines whether the client computer is compatible with the portable media device (PMD) and supports the format of media files stored on the portable media device at 602. This can also happen on a per-file basis. That is, the device may be deemed compatible but some of the files reported by the device may not be in which case they can be skipped. If the client computer is determined compatible to retrieve media data from the portable media device at 602, the MPA queries the portable media device to identify any media files that have been added or modified since the client computer was last synced with the portable media device at 604. The MPA displays the identified media files to the user via a user interface at 606. At 608 a user interacts with the user interface to select identified media files to retrieve from the portable media device for storage in the media library of the client computer. Notably, as described above, retrieval of media files may be automatic, and, thus there may be no user intervention required at all, other than plugging the device into the PC or otherwise establishing a connection (e.g. wirelessly or at the behest of the PC.) At 610, each of the selected media files that are in a format supported by the media player application are retrieved from the portable media device for storage in the media library of the client computer. The portable media device is then queried to identify user defined metadata and/or non-user defined metadata associated with each of the retrieved media files at 612. As described above in reference to FIG. 1, user defined metadata is not a part of the media file itself, but rather is stored separately in a metadata table on the PMD and linked to the media file. Notably, non-user defined metadata (e.g., metadata stored in the file itself) may also be stored in the metadata table on the PMD. For example, a PMD may be unable to update metadata included in the file itself, but can update a version of the same metadata linked to the media file that is stored in the metadata table on the PMD. At 614, any such metadata associated with an identified file is copied to the client computer and stored in a metadata table on the client computer. Thereafter, during playback of the identified file on the client computer, the metadata stored in the metadata table on the client computer and associated with the identified file overrides any overlapping metadata included in the media file itself such as track name, album name, or any other user definable metadata. Optionally, the MPA displays a delete control via the user interface that allows the user of the client computer to delete one or more of the identified media files and associated metadata from the portable media device at 616.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A computer implemented method for transferring media data from a portable device to a client computer during a synchronization process, said portable device storing media data associated with a plurality of media files, said method comprising:

identifying one or more of the plurality of media files on the portable device having media data that has been modified since a last synchronization process, wherein at least one of the identified media files has media data that has been modified since a last synchronization process and media data that has been unmodified since said last synchronization process;

identifying the media data of the modified media files that has been modified since the last synchronization process;

retrieving the identified media data for each identified media file, wherein only the media data that has been modified since the last synchronization process is retrieved for the at least one media file having the modified media data and the unmodified media data; and storing the retrieved media data from the portable device on the client computer.

2. The method of claim 1, wherein the identifying includes requesting a transaction report from the portable device, said transaction report specifying each of the one or more plurality of media files having media data that has been modified since the last synchronization process.

3. The method of claim 2, wherein each of the plurality of media files are assigned a transaction parameter value when initially stored on the portable device, and wherein the transaction parameter value for a particular one of the plurality of media files is increased by a predetermined amount when the media data associated with that particular media file is modified on the portable device, and wherein the transaction report specifies each of the one or more plurality of media files having an increased transaction parameter value since the last synchronization process.

4. The method of claim 2, wherein the retrieving includes retrieving the modified media data for each of the one or more media files specified in the transaction report, wherein only the media data that has been modified since the last synchronization process is retrieved for the at least one media file having the modified media data and the unmodified media data.

5. The method of claim 1, wherein the client computer stores a first time stamp specifying a time of the last synchronization process, and wherein the client computer stores a second time stamp specifying a time of a current synchronization process, and wherein the identifying includes identifying one or more of the plurality of media files stored on the portable device having media data that has been modified between the times specified by the first and second time stamps.

6. The method of claim 5, wherein the retrieving includes retrieving only a portion of the media data of each of the identified one or more media files during the current synchronization process that has been modified since the last synchronization process, and wherein the storing includes merging the retrieved modified portion of the media data with the media data retrieved during the last synchronization process.

7. The method of claim 1 further including displaying each of the identified media files to a user via a display associated with the client computer, and wherein retrieving includes selectively retrieving media data for one or more of the displayed media files in response to input received from the user, wherein only the media data that has been modified since the last synchronization process is retrieved for the at least one media file having the modified media data and the unmodified media data.

8. The method of claim 1 further comprising querying the portable device to identify a new media file stored on the portable device since the last synchronization process, retrieving new media data for the new media file, and storing the new media data on the client computer.

9. The method of claim 1 further including receiving input from a user defining a list of media files to monitor from the plurality of media files, and wherein the identifying includes identifying one or more media files in the defined list of media files having media data that has changed since the last synchronization process.

10. The method of claim 1, wherein retrieving media data includes retrieving media file data and associated metadata.

11. One or more computer-readable media having computer executable components executed by a client computer for transferring media data from a portable device to the client computer during a current synchronization process, said portable device storing media data associated with a plurality of media files, said computer-readable media comprising:

an identification component for identifying one or more of the plurality of media files having different media data since a last synchronization process and for identifying the media data that is different since the last synchronization process, wherein at least one of the identified media files has different media data that has been added or modified since a last synchronization process and existing media data the portable device has been storing since before said last synchronization process was completed;

a retrieval component for retrieving the different media data for each of the identified one or more media files, wherein only the media data that has been added since the last synchronization process is retrieved for the at least one media file having the added media data and the existing media data; and a storage component for storing the different media data on the client computer.

12. The computer-readable media of claim 11, wherein the client computer stores an existing transaction report identifying an existing transaction ID value for each of a first list media files stored on the client computer, and wherein the retrieval component retrieves a current transaction report from the portable device identifying a current transaction ID value for each of a second list media files, and wherein the identification component compares the existing transaction ID value for each of the first list media files to the current transaction ID value for each of the second list media files to identify new media files and modified media files.

13. The computer-readable media of claim 12, wherein the retrieval component additionally retrieves all of the media data associated with of each of the one or more media files identified as new during the current synchronization process.

14. The computer-readable media of claim 12, wherein the retrieval component includes retrieving only a modified portion of the media data of each of the one or more media files identified as modified during the current synchronization process, and wherein the storage component merges the retrieved modified portion of the media data with the media data retrieved during the last synchronization process.

15. The computer-readable media of claim 11 further comprising a user interface component that is responsive to the identification component for displaying each of the identified one or more of the plurality of media files having different media data since the last synchronization process.

16. The computer-readable media of claim 15, wherein user interface component provides a user interface for allowing user interaction with the displayed media files, and wherein the retrieval component is responsive to user input selecting one or more of the displayed media files via the user interface to only retrieve media data associated with the selected one or more media files, and wherein the user interface is responsive to the storage component storing the different media data on the client computer to display a delete option control for allowing the user to delete the selected one or more files from the portable media device.

17. The computer-readable media of claim 15, wherein the user interface component alerts the user if media data associated with the selected media file is currently stored on the client computer.

18. A system for transferring media data from a portable device to the client computer during a synchronization process, said portable device storing media data associated with a plurality of media files, said system comprising:
- an user interface, associated with the client computer, for generating a retrieval request in response to input from a user, said retrieval request requesting the retrieval of media data from the portable media device for storage on the client computer;
- a processor, associated with the client, for executing computer-executable instructions for:
  requesting a current transaction report from the portable device, said transaction report specifying a current transaction ID value for each of a first list media files stored on the portable device;
  retrieving the current transaction report from the portable device; and
  comparing the current transaction ID value for each of the first list of media files included in the retrieved transaction report with an existing transaction ID value for each of a second list of media files specified in an existing transaction report stored on the client computer to identify one or more media files on the portable device having different media data that has been added or modified since a last synchronization process, at least one of said media files also having existing media data that the portable device has been storing since before said last synchronization process was completed; and
- wherein the user interface, associated with the client computer, further displays each of the one or more identified media files and wherein the user interface is responsive to input received from the user to retrieve only the different media data for said at least one media file when said media file is selected by the user via the user interface.

19. The system of claim 18, wherein the user interface is further responsive to different input from the user specifying one or more preferred media files to retrieve the different media data for each of the preferred one or more media files.

* * * * *